April 25, 1939.  E. SEIBOLD  2,155,740
BRAKING MECHANISM FOR RAIL VEHICLES
Filed Nov. 16, 1936  2 Sheets-Sheet 1
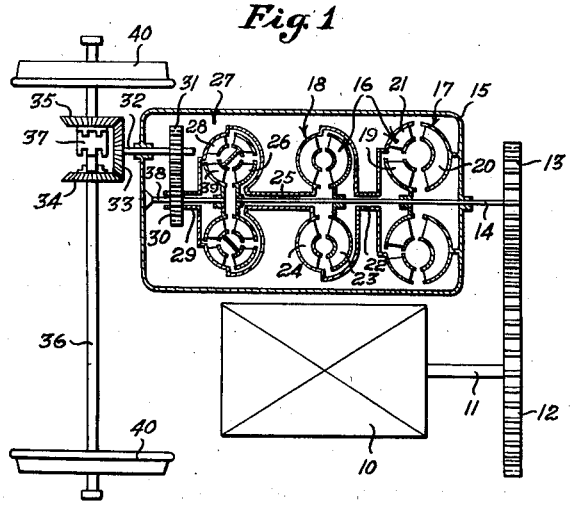
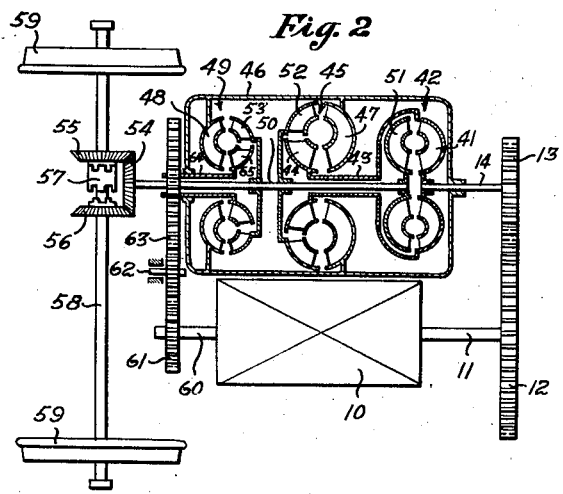
INVENTOR
ERNST SEIBOLD
BY
ATTORNEYS April 25, 1939.  E. SEIBOLD  2,155,740
BRAKING MECHANISM FOR RAIL VEHICLES
Filed Nov. 16, 1936  2 Sheets-Sheet 2
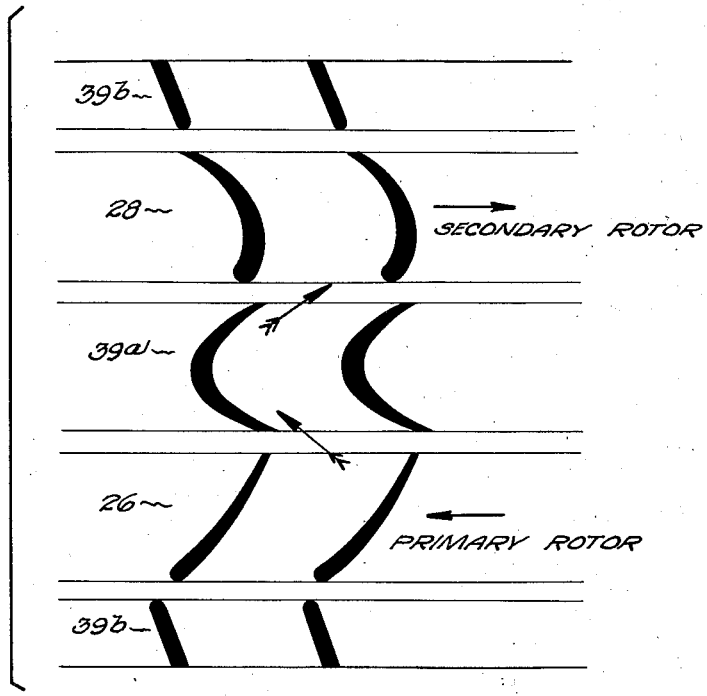
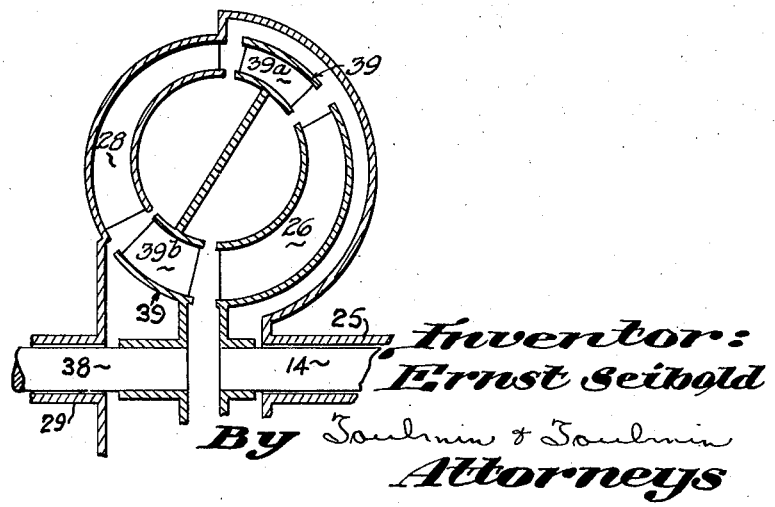
Inventor:
Ernst Seibold
By Toulmin & Toulmin
Attorneys Patented Apr. 25, 1939

2,155,740

UNITED STATES PATENT OFFICE 2,155,740

BRAKING MECHANISM FOR RAIL VEHICLES

Ernst Seibold, Heidenheim, Germany

Application November 16, 1936, Serial No. 111,151
In Germany November 23, 1935

16 Claims. (Cl. 105—96.2)

This invention relates to rail vehicles, and especially to braking mechanisms for such vehicles, particularly those operated by internal combustion engines through hydraulic transmissions.

One object of this invention is to provide a braking arrangement for rail vehicles, wherein a hydraulic braking transmission is provided and arranged to act in opposition to the direction of rotation of the driving transmission for the vehicle.

Another object is to provide a braking arrangement for rail vehicles, wherein the vehicle is driven from an internal combustion engine through a hydraulic transmission, and is provided with a braking unit arranged as a torque converter by having a reversing guide wheel adapted to cause the secondary rotor to rotate oppositely to the primary rotor.

Another object is to provide a rail vehicle having a hydraulic driving transmission and a hydraulic braking unit, wherein the braking effect is initiated by the filling of the braking unit with operating fluid and terminated by the emptying thereof; and optionally wherein the braking effect may be regulated by wholly or partially filling or emptying a plurality of braking units, one after another.

Another object is to provide a rail vehicle having a driving transmission and a hydraulic braking unit so arranged that the braking effect may be varied by varying the speed of rotation of the driving engine.

Another object is to provide such a rail vehicle, wherein the blades of the braking unit are left rough and unmachined.

Another object is to provide a rail vehicle having a driving transmission and one or more braking units arranged coaxially or paraxially with the driving transmission, preferably in a common housing.

Another object is to provide a rail vehicle having a hydraulic driving transmission and a hydraulic braking unit, wherein the secondary rotor of the braking unit is mounted upon the common shaft carrying the secondary rotors of the driving transmission units.

Another object is to provide a rail vehicle having a driving transmission and a hydraulic braking unit, with the primary rotor of the braking unit connected to be positively driven by the engine in an opposite direction to that of its secondary rotor.

In the drawings:

Figure 1 is a diagrammatic plan view, partly in section, showing the rail vehicle propelling mechanism of this invention, having a hydraulic braking unit consisting of a torque converter with reversing guide blades.

Figure 2 is a view similar to Figure 1, but of a modified arrangement employing a hydraulic braking unit with its primary rotor positively driven in the opposite direction from its secondary rotor.

Figure 3 is a diagrammatic representation of the arrangement of the reversing guide blades in the braking torque converter of Figure 1. Figure 4 is a diagrammatic representation of the locations of the reversing guide blades in the braking torque converter of Figure 1.

Hitherto, rail vehicles have been provided with brakes operated by mechanical means, actuated through the agency of compressed air. Such braking mechanisms, when employed at high vehicle speeds or on heavy down grades, result in serious wear of the brake shoes and car wheels. There is also the danger of locking the wheels and thus reducing the braking effect seriously. Where hydraulic transmissions have been provided for driving rail vehicles, some installations have been arranged to brake the vehicle by having the first speed drive, which is normally designed to give a low traveling speed at a maximum torque, arranged to be engaged at higher traveling speeds for braking purposes. At low motor speeds, under such circumstances, the secondary rotor is driven by the axle rotating at a higher speed. This arrangement has the disadvantage that the braking effect is inadequate with heavy down grades and large loads, and the braking effect is also variable only to a small degree.

Another arrangement employs a change-over of the reverse gear on heavy down grades, whereby the secondary rotor is then driven by the driving axles in a direction opposite to the primary rotor. This arrangement permits of a wider variation of the braking effect and an increase of the braking force by increasing the motor speed. A change-over of the reverse gear while the vehicle is in motion brings in difficult problems of design, and requires expensive mechanisms of doubtful reliability, due to the serious wear arising in these change-over mechanisms. Such change-over is necessary, however, if the vehicle is to be brought to a dead stop on a clear track.

In general, the present invention provides a separate hydraulic circuit or braking unit for braking purposes, thereby not only eliminating the above-mentioned disadvantages, but providing the additional advantage that the hydraulic braking effect can be applied smoothly and without shock at all traveling speeds so that a changeover of the reverse gear is not necessary. The braking unit is preferably in the form of a torque converter, which can be placed in the same housing as the driving transmission, and with its shaft either coaxial or paraxial with the driving transmission shaft. For the braking unit there may be used a torque converter with reversing guide blades or normal torque converters, or hydraulic couplings with their primary rotors positively driven by the engine in an opposite direction to their secondary rotors.

The braking effect is initiated by partially or wholly filling the braking unit with working fluid, and is terminated by emptying the braking unit. The braking effect can also be controlled by increasing or decreasing the motor speed. During the operation of the braking unit, it is preferable to empty the units of the hydraulic driving transmission. The heat transmitted to the working fluid by the braking unit can be cooled by the same cooling arrangement which serves the driving transmission. The blade surfaces of the rotors and guide wheel in the braking unit can be left rough or unmachined because the efficiency of the braking torque converter is immaterial. This hydraulic braking arrangement of the present invention is found to be especially important for rail vehicles in service in mountainous country because the new arrangement, employing a braking torque converter, provides a simple and very effective braking device on steep down grades and heavy working loads.

Referring to the drawings in detail, Figure 1 shows one embodiment of the propelling mechanism for the rail vehicle of this invention, the frame thereof being omitted to show the operating elements more clearly. This arrangement consists of an engine or prime mover 10, such as an internal combustion engine, arranged to drive a shaft 11 upon which is mounted a gear 12, meshing with and driving a pinion 13 upon the transmission drive shaft 14. The latter enters a housing 15 containing a hydraulic driving transmission, generally designated 16, and including transmission units, generally designated 17 and 18. The transmission unit 17 is provided with a primary rotor 19, mounted upon the transmission shaft 14, and also has a stationary guide wheel 20 attached to the housing 15. The secondary rotor 21 is mounted upon a hollow shaft 22, through which the transmission shaft 14 passes.

Likewise mounted upon the transmission shaft 14 is the primary rotor 23 of the driving transmission unit 18, the secondary rotor 24 of which is connected to the hollow shaft 22 on one side and to the hollow shaft 25 on the other side. Mounted on the end of the transmission shaft 14 is the primary rotor 26 of the braking unit, generally designated 27, the secondary rotor 28 of which is connected on one side to the hollow shaft 25 and on the other side to a hollow shaft 29 carrying a gear 30. The latter meshes with a gear 31 mounted upon a shaft 32 carrying a bevel gear 33. The bevel gear 33 meshes with bevel gears 34 and 25 mounted to rotate loosely upon the vehicle axle 36, and operatively connected thereto by means of the sliding clutch collar 37. The clutch collar 37 is keyed or otherwise drivingly connected to the axle 36, and carries teeth for selectively engaging one or the other of the gears 34 or 35 so as to drive the vehicle in a forward or reverse direction. To the housing 15 is connected a shaft 38, passing loosely through the hollow shaft 29 and gear 30, and terminating in the stationary reversing guide wheel 39 of the braking unit 27. The axle 36 is provided on either end with driving wheels 40 adapted to roll upon the tracks in the usual way.

In the operation of the braking arrangement shown in Figure 1, the driving units 17 and 18 of the hydraulic driving transmission 16 are emptied of their working fluid and the braking unit, consisting of the hydraulic torque converter 27, is filled wholly or partially with working fluid. Due to the momentum of the vehicle and the engagement of its wheels 40 with the tracks, the secondary rotor 28 of the braking torque converter 27 is driven from the wheels 40 by way of the axle 36, the bevel gears 34 or 35, the bevel gear 33, the shaft 32, the gears 31 and 30 and the hollow shaft 29 on which the secondary rotor 28 is mounted. The traveling speed of the vehicle is then braked by the torque converter 27, through the action of its reversing guide wheel 39. The braking force can be varied by increasing or decreasing the speed of the motor 10 and thereby increasing or decreasing the speed of the primary rotor 26 of the braking torque converter 27.

The braking action in the braking torque converter 27 arises by reason of the fact that the guide wheel 39 thereof is a so-called reversing guide wheel which reverses the fluid flow from the secondary rotor 28. The latter is driven by the vehicle to be braked in such a manner that the primary rotor 26 is driven in a reverse direction from the secondary rotor 28. The energy developed in the vehicle is in this way absorbed in the braking torque converter 27. The braking effect can be varied by letting the motor 10 run with greater or less speed so that the rotations imparted by the motor to the primary rotor, and by the vehicle to the secondary rotor, counteract one another by means of the working fluid flowing through the circuit by way of the reversing guide wheel 39.

In the braking arrangement shown in Figure 2, the motor 10 drives the shaft 11, gear 12, gear 13 and transmission shaft 14 in the usual manner. In this case, however, the primary rotor 41 of the transmission unit 42 is connected to a hollow shaft 43, joining it with the primary rotor 44 of the transmission unit 45. To the casing 46 is connected the stationary guide wheel 47 of the transmission unit 45, and also the stationary guide wheel 48 of the hydraulic braking unit 49. A common shaft 50 carries the secondary rotors 51, 52 and 53 of the hydraulic transmission units 42 and 45 and braking unit 49, respectively. This shaft 50 terminates in a bevel gear 54 adapted selectively to drive one of the bevel gears 55 or 56, through the instrumentality of the clutch collar 57 drivingly connected to the axle 58 carrying the wheel 59, in a manner similar to that described for Figure 1. In Figure 2, however, the motor 10 also drives a shaft 60 carrying a gear 61 meshing with an idler gear 62, which in turn, meshes with a gear 63 mounted upon a hollow shaft 64, which carries the primary rotor 65 of the hydraulic braking unit 49, the latter being a normal torque converter. In this manner the primary rotor 65 of the braking torque converter 49 is positively rotated in the opposite direction to that of its secondary rotor 53.

In the operation of the braking arrangement shown in Figure 2 the motor 10 drives the shaft 14, as described in connection with Figure 1, the transmission units 42 and 45 being emptied of their working fluid while the braking unit 49 is wholly or partially filled with fluid. The secondary rotor 53 of the braking torque converter 49 is now driven by the momentum of the vehicle acting through the engagement of the car wheels 59 with the track and rotating the axle 58, in a manner similar to that described in connection with Figure 1. The primary rotor 65 meanwhile is rotated in the opposite direction to the secondary rotor 53 through its connection with the motor shaft 60, by way of the gears 61, 62 and 63. The available braking force exerted may be varied by increasing or decreasing the speed of rotation of the motor 10.

In a vehicle transmission of the type described, only one of the several fluid power transmitters in a given transmission is filled with fluid at any one time. The transmission shown in Figure 1 for purposes of starting up the torque converter 17 is filled with fluid by means of a conduit leading into the interior of the converter 17. This conduit is supplied with fluid from a supply reservoir by means of a pump. Ordinarily, small openings are provided near the periphery of each transmitter for the carrying away of the working fluid containing the frictional heat produced during the action of the transmitter. While the transmitter is in operation a small part of the working fluid continuously escapes through these peripheral openings, and flows away to a cooler, from which it is conducted back to the supply reservoir.

The emptying of a transmitter is accomplished in a simple manner, merely by interrupting the supply of fluid being conducted to the transmitter. Under these conditions the transmitter empties itself through the previously-mentioned peripheral openings. The braking effect of the braking transmitter 27 depends upon the quantity of fluid with which it is filled. In other words, the smaller the filling of the braking transmitter 27 the lower is the braking effect.

Such arrangements for filling and emptying fluid power transmitters, such as fluid couplings or torque converters, are well known to those skilled in the hydraulic art, and their details form no part of the present invention. Typical forms of such arrangements may be found, for example, in the Radcliffe patent, No. 1,203,265, issued October 31, 1916, and the Lell patent, No. 1,858,514, issued May 17, 1932.

The filling and emptying of the individual fluid power transmitters in the transmission shown in Figure 2 are accomplished in the same way as those shown in Figure 1. The braking effect of the braking transmitter 49 is here accomplished in such a way that the primary and secondary rotors are driven by the vehicle in opposing senses.

Figures 3 and 4 show diagrammatically the arrangement of the reversing guide blades in the braking torque converter 27 with its secondary rotor 28, primary rotor 26 and stationary reversing guide wheel 39 having the component portions 39a and 39b. The arrows in Figure 3 indicate the reversal of direction of flow of the fluid in the guide wheel portion 39a between the primary rotor 26 and secondary rotor 28.

It will be understood that I desire to comprehend within this invention such modifications as come within the scope of the claims and the invention.

Having thus fully described my invention, what I claim as new and desire to secure by Letters Patent, is:

1. In a vehicle braking system, a prime mover, an axle, power transmission means interconnecting said prime mover with said axle to propel said vehicle, and a hydraulic torque converter arranged between said power transmission means and said axle, said hydraulic torque converter having a primary rotor, a secondary rotor and a guide element and being connected to act oppositely to the direction of rotation of said power transmission means.

2. In a vehicle braking system, a prime mover, an axle, power transmission means interconnecting said prime mover with said axle to propel said vehicle, and a hydraulic torque converter arranged between said power transmission means and said axle, said hydraulic torque converter having a primary rotor, a secondary rotor and a guide element and being connected to act oppositely to the direction of rotation of said power transmission means, said guide element comprising a reversing guide wheel adapted to cause the secondary rotor to rotate oppositely to the primary rotor thereof.

3. In a vehicle braking system, a prime mover, an axle, power transmission means interconnecting said prime mover with said axle to propel said vehicle, a hydraulic torque converter arranged between said power transmission means and said axle, said hydraulic torque converter being connected to act oppositely to the direction of rotation of said power transmission means and having a reversing guide wheel adapted to cause the secondary rotor to rotate oppositely to the primary rotor thereof, and reversing means associated with said axle for reversing the relative direction of rotation between said axle and a rotary portion of said braking torque converter.

4. In a vehicle braking system, a prime mover, an axle, power transmission means interconnecting said prime mover with said axle to propel said vehicle, and a hydraulic braking device interposed between said transmission means and said axle, said hydraulic braking device being connected to operate oppositely to the direction of rotation of said power transmission means and having a primary rotor operatively connected to said prime mover and a secondary rotor operatively connected to said axle.

5. In a vehicle braking system, a prime mover, an axle, power transmission means interconnecting said prime mover with said axle to propel said vehicle, and a hydraulic braking device interposed between said transmission means and said axle, said hydraulic braking device having a primary rotor operatively connected to said prime mover, a secondary rotor operatively connected to said axle, and a stationary reversing guide wheel adapted to cause one of said rotors to rotate oppositely to the other rotor.

6. In a vehicle braking system, a prime mover, an axle, power transmission means interconnecting said prime mover with said axle to propel said vehicle, a hydraulic braking device interposed between said transmission means and said axle, and a housing, said hydraulic braking device having a primary rotor operatively connected to said prime mover, a secondary rotor operatively connected to said axle, and a stationary reversing guide wheel connected to said housing and adapted to cause one of said rotors to rotate oppositely to the other rotor.

7. In a vehicle braking system, a prime mover, transmission means and an axle, hydraulic coupling means interconnecting said prime mover with said axle to propel said vehicle, a hydraulic braking device interposed between said transmission means and said axle, said hydraulic coupling means having a primary rotor operatively connected to said prime mover and a secondary rotor operatively connected to said axle, said braking device having a primary rotor operatively connected to said prime mover and a secondary rotor operatively connected to said axle, and means to cause said secondary rotor to act oppositely to the direction of rotation of said transmission means.

8. In a vehicle braking system, a prime mover, transmission means and an axle, hydraulic coupling means interconnecting said prime mover with said axle to propel said vehicle, a hydraulic braking device interposed between said transmission means and said axle, said hydraulic coupling means having a primary rotor operatively connected to said prime mover and a secondary rotor, said braking device having a primary rotor operatively connected to said prime mover and a secondary rotor operatively connected to said axle and to the secondary rotor of said hydraulic coupling means, and means to cause said secondary rotor to act oppositely to the direction of rotation of said transmission means.

9. In a vehicle braking system, a prime mover, transmission means and an axle, hydraulic coupling means interconnecting said prime mover with said axle to propel said vehicle, and a hydraulic braking device interposed between said transmission means and said axle, said hydraulic coupling means having a primary rotor operatively connected to said prime mover and a secondary rotor, said braking device having a primary rotor operatively connected to said prime mover and a secondary rotor operatively connected to said axle and to the secondary rotor of said hydraulic coupling means, said braking device having a reversing guide wheel adapted to cause the braking device primary rotor to rotate oppositely to the secondary rotor thereof.

10. In a vehicle braking system, a prime mover, an axle, power transmission means interconnecting said prime mover with said axle to propel said vehicle, and a hydraulic braking device interposed between said transmission means and said axle, said braking device having one rotor operatively connected to said axle and another rotor operatively connected to said prime mover for rotation in the opposite direction to said one rotor.

11. In a vehicle braking system, a prime mover, an axle, power transmission means interconnecting said prime mover with said axle to propel said vehicle, and a hydraulic torque converter having one rotor operatively connected to said axle, another rotor operatively connected to said prime mover for rotation in a direction opposite to the direction of rotation of said first-mentioned rotor.

12. In a vehicle braking system, a prime mover, an axle, power transmission means interconnecting said prime mover with said axle to propel said vehicle, a hydraulic torque converter having one rotor operatively connected to said axle, and another rotor operatively connected to said prime mover for rotation in a direction opposite to the direction of rotation of said first-mentioned rotor, and a stationary guide wheel associated with said torque converter rotors.

13. In a vehicle braking system, a prime mover, an axle, hydraulic coupling means interconnecting said prime mover with said axle to propel said vehicle, and a hydraulic braking device interposed between said coupling means and said axle, said braking device having one rotor operatively connected to said axle and another rotor operatively connected to said prime mover for rotation in an opposite direction relatively to said first-mentioned rotor.

14. In a vehicle braking system, a prime mover, an axle, a hydraulic transmission unit having primary and secondary rotors operatively interconnecting said prime mover with said axle to propel said vehicle, a hydraulic braking unit having primary and secondary rotors connected between said prime mover and said axle, and a common shaft carrying the secondary rotors of said transmission unit and said braking unit.

15. In a vehicle braking system, a prime mover, an axle, a hydraulic transmission unit having primary and secondary rotors operatively interconnecting said prime mover with said axle to propel said vehicle, a hydraulic braking unit having primary and secondary rotors connected between said prime mover and said axle, a common shaft carrying the secondary rotors of said transmission unit and said braking unit, and means for positively driving said primary rotor of said braking unit for rotation oppositely to the secondary rotor thereof.

16. In a vehicle braking system, a prime mover, an axle, a hydraulic transmission unit having primary and secondary rotors operatively interconnecting said prime mover with said axle to propel said vehicle, a hydraulic braking unit having primary and secondary rotors connected between said prime mover and said axle, a common shaft carrying the secondary rotors of said transmission unit and said braking unit, at least one of said units having a stationary guide wheel, and a casing for said units operatively connected to said stationary guide wheel.

ERNST SEIBOLD.